United States Patent
Zhao et al.

(10) Patent No.: US 9,443,628 B2
(45) Date of Patent: Sep. 13, 2016

(54) CEMENT CURING FORMULATION AND METHOD FOR HIGH-LEVEL RADIOACTIVE BORON WASTE RESINS FROM NUCLEAR REACTOR

(75) Inventors: Ying Zhao, Guangdong (CN); Laixi Huang, Guangdong (CN); Yucai Ye, Guangdong (CN); Ge Gao, Guangdong (CN); Yongdong Ye, Guangdong (CN); Caiyuan Deng, Guangdong (CN); Zhigang Zhang, Guangdong (CN); Jianchun Yuan, Guangdong (CN)

(73) Assignees: China General Nuclear Power Corporation, Guangdong (CN); Dayabay Nuclear Power Operations and Management Co., Guangdong (CN); Guangdong Nuclear Power Joint Venture Co., Ltd., Guangdong (CN); Lingao Nuclear Power Co., Ltd., Guangdong (CN)

( * ) Notice: Subject to any disclaimer, the term of this patent is extended or adjusted under 35 U.S.C. 154(b) by 165 days.

(21) Appl. No.: 14/360,549

(22) PCT Filed: Nov. 25, 2011

(86) PCT No.: PCT/CN2011/082907
§ 371 (c)(1),
(2), (4) Date: Jul. 31, 2014

(87) PCT Pub. No.: WO2013/075322
PCT Pub. Date: May 30, 2013

(65) Prior Publication Data
US 2014/0336437 A1    Nov. 13, 2014

(51) Int. Cl.
| | |
|---|---|
| *G21F 3/03* | (2006.01) |
| *G21F 9/16* | (2006.01) |
| *G21F 9/30* | (2006.01) |
| *B09B 3/00* | (2006.01) |
| *C04B 28/02* | (2006.01) |
| *C04B 7/34* | (2006.01) |
| *C04B 24/26* | (2006.01) |
| *C04B 111/00* | (2006.01) |

(52) U.S. Cl.
CPC ............ *G21F 9/304* (2013.01); *B09B 3/0025* (2013.01); *B09B 3/0041* (2013.01); *C04B 7/34* (2013.01); *C04B 24/26* (2013.01); *C04B 24/2641* (2013.01); *C04B 28/02* (2013.01); *G21F 9/165* (2013.01); *C04B 2111/00767* (2013.01); *Y02W 30/91* (2015.05)

(58) Field of Classification Search
None
See application file for complete search history.

(56) References Cited

U.S. PATENT DOCUMENTS

| | | | | |
|---|---|---|---|---|
| 4,594,186 | A | * | 6/1986 | Kunze ................ G21F 9/301 588/15 |
| 5,441,622 | A | * | 8/1995 | Langford ............... A61L 11/00 204/155 |
| 2006/0074141 | A1 | * | 4/2006 | Hayner .................. G21F 1/10 523/136 |
| 2010/0130398 | A1 | * | 5/2010 | Kaminski ............ C11D 3/3773 510/110 |

FOREIGN PATENT DOCUMENTS

| | | |
|---|---|---|
| CN | 1262513 A | 8/2000 |
| CN | 101456715 A | 6/2009 |
| JP | 4128699 A | 4/1992 |
| JP | 7120594 A | 5/1995 |

OTHER PUBLICATIONS

Malviya, Rachana, et al. "Factors affecting Hazardous waste solidification/stabilization: a review". Journal of Hazardous Materials. 267-276 (2006).*
Sun, Qina; Ll, Junfeng; Wang, Jianlong; Research Progress in Cementation of Radioactive Wastes, Atomic Energy Science and Technology, Dec. 2010, vol. 44, No. 12, pp. 1427-1435, ISSN 1000-6931, p. 1431, right column, line 22 to p. 1432, right column, line 20 (English Abstract).
Ll, Honghui; Fan, Zhiwen; Cementation Treatment for Radioactive Waste at NPPs, Radiation Protection Bulletin, Jun. 2010, vol. 30, No. 3, pp. 34-38, ISSN 1004-6356, p. 36 right column, lines 1-6, and tables 1 and 2A (English Abstract).

* cited by examiner

*Primary Examiner* — Melvin C Mayes
*Assistant Examiner* — Sheng H Davis
(74) *Attorney, Agent, or Firm* — Ladas & Parry LLP (57) ABSTRACT

A cement curing formulation and curing method for high-level radioactive boron waste resins from a nuclear reactor. The curing formulation comprises the following raw materials: cement, lime, water, curing aids and additives. The curing method comprises: (1) weighing the raw materials and the high-level radioactive boron waste resins, and adding lime into a curing container; (2) then adding the high-level radioactive boron waste resins; (3) feeding other raw materials under stirring; (4) adding the cement and supplementing water depending on the moisture state of the cement, and stirring until uniform; and (5) standing and maintaining after stirring until uniform. The curing formulation has the features of a high curing containment rate, high strength of the cured body, better water resistance, better freeze-thaw resistance, and low radioactive leakage.

16 Claims, 1 Drawing Sheet

CEMENT CURING FORMULATION AND METHOD FOR HIGH-LEVEL RADIOACTIVE BORON WASTE RESINS FROM NUCLEAR REACTOR

RELATED APPLICATION

This application is an application under 35 U.S.C. 371 of International Application No. PCT/CN2011/082907 filed on Nov. 25, 2011, the entire contents of which are incorporated herein by reference.

TECHNICAL FIELD

The present application belongs to the technical fields of treatment and disposal of the high radioactive wastes from a nuclear power plant, and it relates to a cement solidification formulation and solidification method for the waste resins from a nuclear power plant, particularly relates to a cement solidification formulation and solidification method for the high level boron containing radioactive waste resins from a nuclear power plant.

BACKGROUND ART

During the operation and decommission of the pressurized water reactor nuclear power plant equipments, a large number of high level boron containing radioactive waste ion exchange resins (hereinafter referred to as waste resin) will be generated, under dry state, the appearances of the waste resins are granular pellets or powders, and if there is no storage container, the waste resins are easily dispersed, upon soaking with water, the radionuclides exchanged and entrained on the waste resins will be desorbed, polluting the environment, thus causing a secondary pollution. The specific gravities of the waste resins are 1.05-1.30, slightly higher than water, when the water content or the resin types and the adsorbed ions are different, the specific gravities of the waste resins are varied. The bulk density of the waste resin in water is 0.65-0.85 g/ml. Upon the water unsaturated waste resins contacting with water, they will absorb water and generate volume expansions, during drying and dehydration, the volumes are reduced, thus having a large volume change. These resins are difficult to regenerate, and it will produce a large amount of radioactive waste water in the regeneration, so they must be properly disposed to reduce their potential environmental hazards. Cement has excellent physical, chemical and mechanical properties, it is a good matrix material for solidifying the radioactive wastes. The solidifications of low and intermediate level radioactive wastes generally adopt the cement solidification, which is a mature treatment technology, also one of the earliest applied radioactive waste treatment technologies. In this treatment, the radioactive liquid wastes or radioactive solid wastes are mixed with cement, water, additives, etc., in a certain proportion, and the mixture is hardened into a waste solidified body at room temperature.

The cement solidified body retains the nuclide ions in the cement solidified body by means of such effects as mechanical sealing, matrix adsorption, solid solution, etc., and the performances of the cement solidified body depend on the chemical composition, physical structure, and the external environment of the cement solidified body. Upon adding water, the cement changes gradually from a slurry with plasticity and fluidity to a solid with a certain strength. The hardened cement slurry is a non-homogeneous multiphase system, which consists of solid phase materials composed of a variety of hydration products and the residual clinkers, and the liquid and air present in the pore spaces. When there are no morphology changes, the ion exchange resin has a considerable chemical stability, the matrix itself is incompatible with the cement, and the cement only plays an embedding effect. However, the major chemical substances adsorbed by the waste resins will be desorbed continuously, and some substances will have a great effect on the cement hydration reaction, causing the cement slurry quick-condensing or slow-condensing, wherein the severe slow-condensing will result in a complete non-condensing. For example, the objects to be treated by the present application, i.e. the high boron containing waste resins, if treated with the existing cement solidification agents, the cement slurry non-condensing phenomenon will occur because borates are the commonly used cement retarders.

Upon the cement solidification of the waste resins, the resins are embedded in the cavity of the solidified body, i.e., the whole solidified body has a cage-like structure. The cement composition, the forming water-cement ratio and the forming conditions together determine the microporous structure of the cement solidified body, and the microporous structure in turn determines almost all of the physicochemical properties of the cement solidified body, such as density, strength, thermal property, durability and the like. The radionuclide ions can diffuse into the external medium via the communicating micropores in the cement solidified body. Numerous studies show that, during the cement solidification, the type and amount of the cement, the property and amount of the resin, the additive composition, the water-cement ratio, the solidification operation process, etc., have a great effect on the performances of the solidified body. When the formulation is unreasonable, the cement solidified body has a high enlargement ratio, upon contacting with water, it will expand and generate cracks, or even broken, thus the leaching rate of the radionuclides is high, which cannot achieve the performance index of the cement solidified body specified in the National Standards. Additionally, in this field, the containment rate to the waste resins of about 50% water content is typically less than 40%, the lower containment rate will increase the waste production and waste disposal costs, wherein the containment rate refers to the percentage of the contained substances in the total volume of the containing substances.

In the existing waste resin cement solidification techniques, many of them still use zeolite as an additive to reduce the consumption of cement, when other aggregate such as sand is not used during solidifying the waste resins, the proportion of the cement used is high, thus a high hydration heat phenomenon appears, in the bulk concretes, the high hydration heat will result in the core temperature of the waste resin solidified body excessively high, thus causing the solidified body expanding and reducing the performances of the waste solidified body. As for the solidification process using, for example, sulphoaluminate cement, which has a high hydration heat and an intensive release time, adding zeolite is an effective control method, which is commonly used in the preparation of the conventional concrete for controlling the hydration heat. However, the solidification of the high level boron containing radioactive waste resins is different from the preparation of the general concrete, as well as the solidification of the general radioactive waste resins, because the high level boron containing radioactive waste resin liquid wastes contain a large amount of borate ions and other anions and cations adsorbed in the ion exchange resin, upon the cement solidification, the borate ions and the anions and cations desorbed from the ion exchange resin change the chemical properties of the cement solidified body, so that upon zeolite, used as an additive, reaching a certain amount, the performances of the cement solidified body will be reduced, even upon the cement solidified body contacting with water, the solidified body is pulverized.

In addition, a large amount of borate ions contained in the high level boron containing resins, result in a long condensation time during the cement solidification, which has a great effect on the performances of the cement solidified body, it is possible to cause such problems as non-condensing of the cement slurry, low strength of the cement solidified body and floating and delamination of the resins, etc., this is the reason why the compositions of many existing cement solidification formulations are partly identical, but they cannot be directly used for the cement solidification of high level boron containing waste resin.

SUMMARY

Aiming at the defects of the cement solidification formulations in the conventional techniques, such as low solidification containment capacity, high core temperature of the solidified body, poor cement slurry condensation and low solidification strength, a technical problem to be solved by the present application is to provide a cement solidification formulation for the high level boron containing radioactive waste resins from a nuclear power plant with high solidification containment capacity, low core temperature of the solidified body, high leaching rate and solidification strength, all of the performances meeting the National Standards, and high safety.

Another technical problem to be solved by the present application is to provide a solidification method for the high level boron containing radioactive waste resins from a nuclear power plant by using the above-mentioned cement solidification formulation, which is simple to operate, and has good solidification effects.

One technical solution according to the present application is: a cement solidification formulation for the high level boron containing radioactive waste resins from a nuclear power plant, which comprises the following raw materials by weight: 170-260 parts of cement, 5-20 parts of lime, 20-60 parts of water, 0.25-10 parts of curing agent and 2-20 parts of additive agent, on the basis of solidifying 100 parts by weight of the high level boron containing waste resins.

Preferably, the cement solidification formulation comprises the following raw materials in parts by weight: 170-200 parts of cement, 10-20 parts of lime, 20-40 parts of water, 0.25-10 parts of curing agent and 4-15 parts of additive agent, on the basis of the solidification of 100 parts by weight of the high level boron containing waste resins.

Preferably, the additive agent in the cement solidification formulation is a mixture of at least two components selected from the group consisting of sodium hydroxide, lithium carbonate and sodium silicate.

Preferably, in the cement solidification formulation, the curing agent includes a polycarboxylate water reducing agent in 0.25-5 parts by weight.

Preferably, in the cement solidification formulation, the polycarboxylate water reducing agent is one selected from the group consisting of sodium polyacrylate, potassium polyacrylate, sodium polybutenoate, potassium polybutenoate, Basf glenium51 (the brand of a water reducing agent) and Sika ViscoCrete (the band of a water reducing agent).

Preferably, the curing agent in the cement solidification formulation further comprises 1-5 parts by weight of sodium metaaluminate.

More preferably, on the basis of solidifying 100 parts by weight of the high level boron containing waste resins, the cement solidification formulation comprises the following raw materials in parts by weight: 198 parts of cement, 11 parts of lime, 30 parts of water, 0.25 parts of curing agent and 3.70 parts of additive agents; wherein the curing agent is sodium polyacrylate, and the additive agent is a mixture of sodium hydroxide and lithium carbonate.

More preferably, on the basis of solidifying 100 parts by weight of the high level boron containing waste resins, the cement solidification formulation comprises the following raw materials in parts by weight: 184 parts of cement, 10 parts of lime, 19 parts of water, 2 parts of curing agent and 2 parts of additive agent; wherein the curing agent is sodium polybutenoate, and the additive is a mixture of sodium hydroxide and sodium silicate.

More preferably, on the basis of solidifying 100 parts by weight of the high level boron containing waste resins, the cement solidification formulation comprises the following raw materials in parts by weight: 170 parts of cement, 9 parts of lime, 29 parts of water, 1 part of curing agent and 2.3 parts of additive agent; wherein the curing agent is SikaViscoCrete 20HE, and the additive agent is a mixture of lithium carbonate and sodium silicate.

The technical solution used to solve another technical problem of the present application is: a solidification method for the high level boron containing radioactive waste resins from a nuclear power plant, comprising the steps of:
1) weighing or metering the raw materials of solidification agents of the solidification formulation and the high level boron containing waste resins, the solidification formulation comprising the following raw materials in parts by weight: 170-260 parts of cement, 5-20 parts of lime, 20-60 parts of water, 0.25-10 parts of curing agent and 2-20 parts of additive agent, on the basis of solidifying 100 parts by weight of the high level boron containing waste resins;
2) adding the lime in the raw materials into the solidification container;
3) adding the high level boron containing waste resins and the residual raw materials of the solidification agents except water with stirring;
4) adding the cement with stirring, adding water during stirring, and stirring to homogeneity;
5) standing and maintaining after stirring to homogeneity.

In the step 1), on the basis of solidifying 100 parts by weight of the high level boron containing waste resins, the solidification formulation preferably comprises the raw materials in parts by weight of: 170-200 parts of cement, 10-20 parts of lime, 20-40 parts of water, 0.25-10 parts of curing agent and 4-15 parts of additive agent.

In the step 1), preferably, the additive in the solidification formulation is a mixture of at least two selected from the group consisting of sodium hydroxide, lithium carbonate and sodium silicate.

In the step 1), preferably, the curing agent comprises a polycarboxylate water reducing agent in 0.25-5 parts by weight.

In the step 1), preferably, the polycarboxylate water reducing agent in the solidification formulation is selected from the group consisting of sodium polyacrylate, potassium polyacrylate, sodium polybutenoate, potassium polybutenoate, Basf glenium51 and Sika ViscoCrete.

In the step 1), the curing agent further comprises 1-5 parts by weight of sodium metaaluminate.

In the step 1) of the solidification method, preferably, the weight ratio of the free water contained in the high level boron containing waste resins is detected and converted into the weight of the high level boron containing waste resins to be weighed and the weight of water to be weighed, the variety of the raw materials of the solidification agents were weighed, and the curing agent and the additives were dissolved in water to prepare a solution.

In the step 3) of the solidification method, preferably, the high level boron containing waste resins with free water are added into the solidification container via the metering tank, the stirring paddle is actuated to carry out stirring, then the curing agent and the additives are added, wherein the start stirring speed is 15-25 rpm, the late stirring speed is 40-60 rpm, the sum of the stirring time is 100-120 min, and the stirring mode is a vertical shaft type.

In the step 4) of the solidification method, preferably, the stirring machine is started at a speed of 15-25 rpm; the cement is added slowly at a speed of 800-1200 kg/h into the container with stirring via the cement hopper; the water is added stepwise under stirring until the amount of water by weight meets the requirements of the solidification agents formulation, stirring is continued for 0.5 h, and the stirring is carried out by moving the paddle up and down, until stirring to homogeneity.

In the step 5) of the solidification method, preferably, after the stirring is stopped the solidification container is sent to the maintaining room, covered with coverings on the surface and stood and maintained for 28 days.

Compared with the conventional techniques, the cement solidification formulations of the present application have following beneficial effects:

The cement solidification formulations of the present application are the cement solidification formulations for the high level boron containing radioactive waste resins, wherein the solidification matrix components are cement, lime, water, curing agent and additives, the solidification matrixes are mixed with the high level boron containing waste resins to form the cement blocks with high hardness, and the high level boron containing waste resins are dispersed and embedded in the cement blocks with high hardness. As compared with the conventional techniques, the cement solidification formulations of the present application have good advantages: the high level boron containing waste resins are uniformly dispersed in the cement solidified body, i.e., the high level boron containing waste resin particles are dispersed and embedded, when the solidified body is destroyed to crack, or broken to form may solidified body fragments, the high level boron containing waste resins can still be in an embedded state, thus reducing the risk of radioactive leakage, and having higher safety. Furthermore, it is because that the waste resins can be dispersed and embedded, the present application can achieve that the solidified body has high solidification containment capacity and high solidification strength, and reduces the leaching rate, wherein the containment capacity can generally reach 40% (V/V) or more, optimally reach 59% (V/V), and other performance indexes of the cement solidified body are all meet the requirements of National Standard GB14569.1-2011. As such, it is desirable to contain the waste resins as much as possible, and reduce the amount of the radioactive solid wastes, thereby reducing the radioactive waste disposal costs, provided that the requirements of the National Standard are met.

More importantly, the cement solidification agent formulations of the present application solve the problems in the existing cement solidification, such as long condensation time and low strength caused by the high level boron containing resins. And zeolite is not used as a water reducing agent to prevent the problems, such as low solidification performance and water pulverization caused upon adding zeolite to a certain amount.

The additive agent is a mixture of at least two selected from the group consisting of sodium hydroxide, lithium carbonate, and sodium silicate, the curing agent is a polycarboxylate water reducing agent, such as sodium polyacrylate, a polycarboxylate high efficient water reducing agent, such as a water reducing agent with a commodity brand of Basf glenium51, a polycarboxylate high efficient water reducing agent, such as a water reducing agent with a commodity brand of Sika ViscoCrete, etc. These additives and curing agent are formulated specifically for the high level boron containing waste resins, the additives and the curing agent have synergistic effects, thus effectively solving the problems, such as non-condensing of the cement slurry, low strength of the cement solidified body, and floating and delamination of the resins, etc., and most of all, increasing the containment rate of the cement solidified body.

As compared with the conventional techniques, the solidification methods of the present application have beneficial effects:

After adding the raw materials, a false condensation phenomenon will appear during stirring, first the high level boron containing radioactive waste resins uniformly dispersed in the mixture by stirring is fixed at a position, then dispersed and embedded by the solidified body in the subsequent standing and solidification process, thus achieving high containment rate, high strength, and low leaching rate. The application has low requirements on the solidification process conditions, is easy to implement and simple to operate, has excellent solidification effects, and can meet the requirements for on-site solidification.

DETAILED DESCRIPTION OF THE PREFERRED EMBODIMENTS

Hereinafter, the present application will be further described with reference to the accompanying drawings and in combination with the particular embodiments.

A cement solidification formulation for the high level boron containing radioactive waste resins from a nuclear power plant comprises by weight: 170-260 parts of cement, 5-20 parts of lime, 20-60 parts of water, 0.25-10 parts of curing agent and 2-20 parts of additive agent, on the basis of solidifying 100 parts by weight of the high level boron containing waste resins.

The cement solidification formulation, on the basis of solidifying 100 parts by weight of the high level boron containing waste resins, preferably comprises the following raw materials in parts by weight: 170-200 parts of cement, 10-20 parts of lime, 20-40 parts of water, 0.25-10 parts of curing agent and 4-15 parts of additives.

In the cement solidification formulation, the additive is preferably a mixture of at least two selected from the group consisting of sodium hydroxide, lithium carbonate, and sodium silicate.

In the cement solidification formulation, the curing agent comprises a polycarboxylate water reducing agent in 0.25-5 parts by weight.

In the cement solidification formulation, the polycarboxylate water reducing agent is one selected from the group consisting of sodium polyacrylate, potassium polyacrylate, sodium polybutenoate, potassium polybutenoate, Basf glenium51 (the brand of a water reducing agent), and Sika ViscoCrete (the brand of a water reducing agent).

In the cement solidification formulation, the curing agent further comprises sodium metaaluminate in 1-5 parts by weight.

More preferably, on the basis of solidifying 100 parts by weight of the high level boron containing waste resins, the cement solidification formulation comprises the following raw materials in parts by weight: 198 parts of cement, 11 parts of lime, 30 parts of water, 0.25 parts of curing agent and 3.70 parts of additive; wherein the curing agent is sodium polyacrylate, and the additive is a mixture of sodium hydroxide and lithium carbonate.

More preferably, the cement solidification formulation comprises the following raw materials in parts by weight: 184 parts of cement, 10 parts of lime, 19 parts of water, 2 parts of curing agent, and 2 parts of additive agent, on the basis of solidifying 100 parts by weight of the high level boron containing waste resins; wherein the curing agent is sodium polybutenoate, and the additive is a mixture of sodium hydroxide and sodium silicate.

More preferably, on the basis of solidification of 100 parts by weight of the high level boron containing waste resins, the cement solidification formulation comprises the following raw materials in parts by weight: 170 parts of cement, 9 parts of lime, 29 parts of water, 1 part of curing agent, and 2.3 parts of additive agent; wherein the curing agent is SikaViscoCrete 20HE, and the additive is a mixture of lithium carbonate and sodium silicate.

The technical solution used to solve another technical problem of the present application is: a solidification method for the high level boron containing radioactive waste resins from a nuclear power plant, comprising the steps of:
1) weighing or metering the raw materials of the solidification agents and the high level boron containing waste resins, wherein the cement solidification formulation of the solidification agents comprises the following raw materials in parts by weight: 170-260 parts of cement, 5-20 parts of lime, 20-60 parts of water, 0.25-10 parts of curing agent and 2-20 parts of additive agent, on the basis of solidifying 100 parts by weight of the high level boron containing waste resins;
2) adding the lime in the raw materials into a solidification container;
3) adding the waste resins and the residual raw materials of the solidification agents but no water with stirring;
4) adding the cement with stirring, adding water during stirring, and stirring to homogeneity;
5) standing and maintaining after stirring to homogeneity.

In the step 1), on the basis of solidifying 100 parts by weight of the high level boron containing waste resins, the cement solidification formulation preferably comprises by weight: 170-200 parts of cement, 10-20 parts of lime, 20-40 parts of water, 0.25-10 parts of curing agent and 4-15 parts of additive agent.

In the step 1), preferably, the additive in the cement solidification formulation is a mixture of at least two of sodium hydroxide, lithium carbonate, and sodium silicate.

In the step 1), the curing agent preferably comprises a polycarboxylate water reducing agent in 0.25-5 parts by weight.

In the step 1), preferably, the polycarboxylate water reducing agent in the solidification formulation is selected from the group consisting of sodium polyacrylate, potassium polyacrylate, sodium polybutenoate, potassium polybutenoate, Basf glenium51, and Sika ViscoCrete.

In the step 1), preferably, the curing agent further comprises sodium metaaluminate in 1-5 parts by weight.

In the step 1) of the solidification method, preferably, the addition amount of the high level boron containing waste resins is calculated based on the weight ratio of the free water contained in the waste resins, and the curing agents and additives are dissolved in water to prepare a solution.

In the step 3) of the solidification method, preferably, the high level boron containing waste resins with free water are added into the solidification container via the metering tank, the stirring paddle is actuated to carry out stirring, then the curing agent and additives are added, wherein the start stirring speed is 15-25 rpm, the late period stirring speed is 40-60 rpm, the sum of the stirring time is 100-120 min, and the stirring mode is a vertical shaft type.

In the step 4) of the solidification method, preferably, the stirring machine is actuated, at a speed of 15-25 rpm, and the cement is added slowly into the container with stirring via the cement hopper, the speed thereof is 800-1200 kg/h, water is added stepwise during stirring to the parts by weight of water for meeting the requirements of the solidification agents, stirring is continued for 0.5 h, and the stirring is carried out by moving the paddle up and down, until stirring to homogeneity.

In the step 5) of the solidification method, preferably, after the stirring is stopped, the solidification container is sent to the maintaining room, covered with the coverings on the surface, and stood and maintained for 28 days.

Hereinafter, the above-mentioned technical solutions are described by several examples.

1. First, the cement solidification formulations are described in detail:

Example 1

A cement solidification formulation for the high level boron containing radioactive waste resins from a nuclear power plant, on the basis of solidifying 100 kg of the high level boron containing waste resins, this formulation comprised by weight: 198 kg of ordinary portland cement 42.5#, 11 kg of lime, 30 kg of water, 0.25 kg of sodium polyacrylate, and 3.70 kg of additives (the mixture of sodium hydroxide and lithium carbonate). In this example, the high level boron containing radioactive waste resins had a containment rate of 46%.

Example 2

A cement solidification formulation for the high level boron containing radioactive waste resins from a nuclear power plant, on the basis of solidifying 100 kg of the high level boron containing waste resins, comprising: 184 kg of ordinary portland cement 42.5#, 10 kg of lime, 19 kg of water, 2 kg of sodium polybutenoate, and 2 kg of additives (a mixture of sodium hydroxide and sodium silicate). In this example, the high level boron containing radioactive waste resins had an containment rate of 50%.

Example 3

A cement solidification formulation for the high level boron containing radioactive waste resins from a nuclear power plant, on the basis of solidifying 100 kg of the high level boron containing waste resins, comprised the raw materials by weight of: 170 kg of ordinary portland cement 42.5#, 9 kg of lime, 29 kg of water, 1 kg of polycarboxylate water reducing agent SikaViscoCrete 20HE (commodity brand), and 2.3 kg of additives (a mixture of sodium silicate and lithium carbonate), and the high level boron containing radioactive waste resins had a containment rate of 59%.

Example 4

A cement solidification formulation for the high level boron containing radioactive waste resins from a nuclear power plant, on the basis of solidifying 100 kg of the high level boron containing waste resins, comprised the raw materials by weight of: 260 kg of ordinary portland cement, 15 kg of lime, 40 kg of water, 5 kg of potassium polybutenoate, 5 kg of sodium metaaluminate, and 6 kg of additives (a mixture of sodium hydroxide and lithium carbonate). In this example, the high level boron containing radioactive waste resins had a containment rate of 41%.

Example 5

A cement solidification formulation for the high level boron containing radioactive waste resins from a nuclear power plant, on the basis of solidifying 100 kg of the high level boron containing waste resins, comprised the raw materials by weight of: 200 kg of ordinary portland cement, 15 kg of lime, 40 kg of water, 10 kg of polycarboxylate high efficient water reducing agent Basf glenium51 (commodity brand), and 8 kg of additives (a mixture of sodium hydroxide and lithium carbonate). In this example, the high level boron containing radioactive waste resins had a containment rate of 49%.

2. Hereinafter, the high level boron containing waste resins generated from a nuclear power plant are selected, and solidified with the solidification formulations of examples 1-5 of the present application respectively, by the solidification methods of the present application.

Example 6

A solidification method for the high level boron containing radioactive waste resins from a nuclear power plant, comprised the steps of:
1) according to the formulation ratio of the solidification agents in the above example 1, a variety of raw materials of the solidification agents were weighed; wherein the weight ratio of the free water contained in the high level boron containing waste resins was detected and converted into the weight of the high level boron containing waste resins to be weighed and the weight of water to be weighed, and weighed or metered, and the curing agent and additives were dissolved in water to prepare a solution;
2) the lime in the raw materials of the solidification agents was added into in the solidification container;
3) the high level boron containing waste resins with free water were added into the solidification container via the metering tank, the stirring paddle was actuated to carry out stirring, then the solution of curing agent and additives except water were added, wherein the early stirring speed was 15 (revolutions per minute, rpm), the late stirring speed was 60 rpm, the sum of the stirring time was 100 min, and the stirring mode was a vertical shaft type;
4) the stirring machine was actuated, at a speed of 25 rpm, the cement was added slowly into the container with stirring via the cement hopper, at a speed of 800 kg/h, the water was added stepwise during stirring to the parts by weight of water for meeting the requirements of the solidification agents, stirring was continued for 0.5 h, the stirring was carried out by moving the paddle up and down, until stirring to homogeneity;
5) after the stirring was stopped, the solidification container was sent to the maintaining room, covered with coverings on the surfaces, and stood and maintained for 28 days to obtain a cement solidified body sample 1-1, the same raw materials and the same processes were repeated to obtain five samples with serial numbers of 1-2~1-6.

Example 7

A solidification method for the high level boron containing radioactive waste resins from a nuclear power plant, comprised the steps of:
1) according to the formulation ratio of the cement solidification formulation in the above example 2, a variety of raw materials of the solidification agents were weighed; the weight ratio of the free water contained in the high level boron containing waste resins was detected and converted into the amount of the high level boron containing waste resins to be added and the amount of water to be added, and a variety of raw materials in the above solidification formulation were weighed, and the curing agent and additives were dissolved in water to prepare a solution;
2) the lime in the raw materials was added into the solidification container;
3) the high level boron containing waste resins with free water were added into the solidification container via the metering tank, the stirring paddle was actuated to carry out stirring, then the solutions of curing agent and additive except water was added, wherein the early stirring speed was 25 rpm (revolutions per minute, rpm); the late stirring speed was 40 rpm, the sum of the stirring time was 110 min, and the stirring mode was a vertical shaft type;
4) the stirring machine was actuated, at a speed of 15 rpm, the cement was added slowly into the container with stirring via the cement hopper, at a speed of 1200 kg/h, water was added stepwise during stirring to the parts of weight of water for meeting the requirements of the solidification formulation, stirring was continued for 0.5 h, and the stirring was carried out by moving the paddle up and down, until stirring to homogeneity;
5) after the stirring was stopped, the solidification container was sent to the maintaining room, covered with coverings on the surface and stood and maintained for 28 days to obtain a cement solidified body sample 2-1, the same raw materials and the same processes were repeated to obtain 19 samples with serial numbers of 2-2-2-20.

Example 8

A solidification method for the high level boron containing radioactive waste resins from a nuclear power plant, comprised the steps of:

1) according to the formulation ratio of the solidification formulation in the above example 3, a variety of raw materials of the solidification agents were weighed or metered; the weight ratio of free water contained in the high level boron containing waste resin was detected, and converted into the amount of the high level boron containing waste resins to be added and the amount of water to be added, a variety of raw materials in the above solidification formulation were weighed, and the curing agent and the additives were dissolved in water to prepare a solution;
2) the lime in the raw materials was added into the solidification container;
3) the high level boron containing waste resins with free water were added into the solidification container via the metering tank, the stirring paddle was actuated to carry out stirring, then the solution of the curing agent and additives except water was added, wherein the early stirring speed was 20 rpm (revolutions per minute, rpm), the late stirring speed was 50 rpm, the sum of the stirring time was 110 min, and the stirring mode was a vertical shaft type;
4) the stirring machine was actuated, at a speed of 20 rpm, the cement was added slowly into the container with stirring via the cement hopper, at a speed of 1100 kg/h, water was added stepwise during stirring to the parts by weight of water for meeting the requirements of the solidification agents, stirring was continued for 0.5 h, and the stirring was carried out by moving the paddle up and down, until stirring to homogeneity;
5) after the stirring was stopped, the solidification container was sent to the maintaining room, covered with coverings on the surface and stood and maintained for 28 days to obtain a cement solidified body sample 3-1, the same raw materials and the same processes were repeated to obtain five samples with serial numbers of 3-2-3-6.

Example 9

A solidification method for the high level boron containing radioactive waste resins from a nuclear power plant, comprised the steps of:
1) according to the formulation ratio of the solidification formulation in the above example 4, a variety of raw materials of the solidification agents were weighed or metered; the weight ratio of the free water contained in the high level boron containing waste resins was detected and converted into the amount of the high level boron containing waste resins to be added and the amount of water to be added, a variety of raw materials of the above solidification formulation were weighed, and the curing agent and the additives were dissolved in water to prepare a solution;
2) the lime in the raw materials was added into the solidification container;
3) the high level boron containing waste resins with free water were added into the solidification container via the metering tank, the stirring paddle was actuated to carry out stirring, then the solution of the curing agent and the additives except water was added, wherein the early stirring speed was 22 rpm (revolutions per minute, rpm); the late stirring speed was 55 rpm, the sum of the stirring time was 100 min, and the stirring mode was a vertical shaft type;
4) the stirring machine was actuated, at a speed of 16 rpm, the cement was added slowly into the container with stirring via the cement hopper, at a speed of 900 kg/h, water was added stepwise during stirring to the parts by weight of water for meeting the requirements of the solidification agents, stirring was continued for 0.5 h, and the stirring was carried out by moving the paddle up and down, until stirring to homogeneity;
5) after the stirring was stopped, the solidification container was sent to the maintaining room, covered with coverings on the surface and stood and maintained for 28 days to obtain a cement solidified body sample 4-1, and the same raw materials and the same processes were repeated to obtain five samples with serial numbers of 4-2-4-6.

Example 10

A solidification method for the high level boron containing radioactive waste resins from a nuclear power plant, comprised the steps of:
1) according to the formulation ratio of the solidification formulation in the above example 5, the raw materials of the solidification agents formulation were weighed or metered; the weight ratio of the free water contained in the high level boron containing waste resins was detected and converted into the amount of the high level boron containing waste resins to be added and the amount of water to be added, a variety of raw materials of the above solidification agents were weighed, and the curing agent and the additives were dissolved in water to prepare a solution;
2) the lime in the raw materials was added into the solidification container;
3) the high level boron containing waste resins with free water were added into the solidification container via the metering tank, the stirring paddle was actuated to carry out stirring, then the solutions of the curing agent and the additive was added, wherein the early stirring speed was 18 rpm (revolutions per minute, rpm); the late stirring speed was 45 rpm, the sum of the stirring time was 10 min, and the stirring mode was a vertical shaft type;
4) the stirring machine was actuated, at a speed of 19 rpm; the cement was added slowly into the container with stirring via the cement hopper, at a speed of 1150 kg/h, water was added stepwise during stirring to the parts by weight of water for meeting the requirements the solidification formulation, stirring was continued for 0.5 h, and the stirring was carried out by moving the paddle up and down, until stirring to homogeneity;
5) after the stirring was stopped, the solidification container was sent to the maintaining room, covered with coverings on the surface, and stood and maintained for 28 days to obtain a cement solidified body sample 5-1, and the same raw materials and the same processes were repeated to obtain five samples with serial numbers of 5-2~5-6.

Example 11

The engineering-scale heat-test experiments of the boron-containing waste resins cement solidification were carried out at a nuclear power plant on-site:
1) the high level boron containing waste resins and the cement solidification agents were added according to the amounts by weight as follows, wherein the amount of the free water contained in the high level boron containing waste resins was detected and computed the amount of the high level boron containing waste resins to be added and the amount of water to be added, high level boron containing waste resins (with water): 430 kg; cement: 737.7 kg; lime 40.57 kg, curing agent and additives: 55.3 kg; the amount of the required additional supplementing water except the amount of water in the waste resins: 80 L. The curing agent and additives were dissolved to prepare a solution;
2) the lime was added into a solidification barrel of 1 cubic meter (1 m$^3$);
3) the waste resins were added into the solidification barrel of 1 cubic meter via the metering tank, with the paddle stirring continuously; 55.3 kg of the curing agent, polycarboxylate water reducing agent Basf glenium51 (commodity brand), and the additive, a mixture of sodium hydroxide and carbonate lithium, were added.
4) after the waste resins were discharged, the metering tank was rinsed with water, and the water was added into the barrel; the cement was added and stirring was continued; then the addition of the cement was stopped, as it was found that the dried surface of the cement was stacked on the top, and it was difficult to continue stirring. Then 30 L water was added (the additional water 80 L in total), stirring was continued and the cement was added; after the cement was discharged, the barrel of 1 cubic meter was taken out and hanged down with a crane, the surface had been found false initial condensation, and a temperature probe was inserted to observe the temperature, and it was found that the temperature was increased from 19° C. to 32° C. slowly.

The temperature increase caused by the hydration of the cement slurry was detected by a RS285-661 type PTE plate temperature patch, externally connected with a RS363-0238 type temperature transmitter, using the method that 1-5V signals were input into the dual-channel Yokogawa recorder to carry out a continuous measurement. Two PTE plate temperature patches were respectively placed in the center of the solidification barrel and the midpoint from the center to the concrete barrel wall, and the insertion depth was a half of the height of the cement slurry. As seen from the measurement results: a hydration exothermic reaction was occurred in the cement slurry over one day. The maximum temperature at the core of the cement solidified body was lower than 80° C., which met the requirements proposed by the Chinese and foreign experts that the core temperature of the cement solidified body should be lower than 80° C.

Finally, the cement solidified body sample 7-1 was obtained, and the same raw materials and the same processes were repeated to obtain five samples with serial numbers of 7-2~7-6.

In addition to the above-mentioned examples, further examples were set forth below, on the basis of treating 100 kg of the high level boron containing waste resins:

| | Formulation of the solidification agents | | | | | Serial No. of the cement | |
|---|---|---|---|---|---|---|---|
| | Cement (kg) | Lime (kg) | Water (kg) | Curing agent (kg) | Additive (kg) | solidification body sample | Containment rate (%) |
| Example 12 | 170 | 15 | 30 | sodium polybutenoate 1 | Mixture of sodium hydroxide and lithium carbonate 2.3 | 12-1 | 57 |
| Example 13 | 172 | 9 | 29 | Sodium polyacrylate 1 | Sodium hydroxide and sodium silicate 2.3 | 13-1 | 53.2 |
| Example 14 | 180 | 11 | 20 | Sodium polyacrylate 1, sodium metaaluminate 1 | Mixture of lithium carbonate and sodium silicate 2 | 14-1 | 51 |
| Example 15 | 185 | 10 | 31 | Potassium polyacrylate 0.25 | Mixture of sodium hydroxide and lithium carbonate 3.5 | 15-1 | 50 |
| Example 16 | 190 | 13 | 35 | Potassium polyacrylate 0.5, sodium metaaluminate 2 | Mixture of lithium carbonate and sodium silicate 4 | 16-1 | 48 |
| Example 17 | 195 | 6 | 32 | Potassium polybutenoate 5 | Mixture of sodium hydroxide and sodium silicate 10 | 17-1 | 47.5 |
| Example 18 | 210 | 15 | 40 | Basf glenium51 10 | Mixture of sodium hydroxide and sodium silicate 12 | 18-1 | 46.4 |
| Example 19 | 220 | 18 | 43 | Basf glenium51 2, sodium metaaluminate 3 | Mixture of lithium carbonate and sodium silicate 18 | 19-1 | 45.1 |
| Example 20 | 225 | 7 | 34 | Sodium polybutenoate 0.8 | Mixture of sodium hydroxide and lithium carbonate 20 | 20-1 | 44.8 |

-continued

| | Formulation of the solidification agents | | | | Serial No. of the cement | |
|---|---|---|---|---|---|---|
| | Cement (kg) | Lime (kg) | Water (kg) | Curing agent (kg) | Additive (kg) | solidification body sample | Containment rate (%) |
| Example 21 | 230 | 20 | 45 | Potassium polybutenoate 1.3 | Mixture of lithium carbonate and sodium silicate 16 | 21-1 | 43.2 |
| Example 22 | 240 | 16 | 60 | Sika ViscoCrete 3 | Mixture of sodium hydroxide and sodium silicate 9 | 22-1 | 43.5 |
| Example 23 | 250 | 5 | 55 | Potassium polybutenoate 7, sodium metaaluminate 1 | Mixture of sodium hydroxide, lithium carbonate and sodium silicate 17 | 23-1 | 43.3 |
| Example 24 | 260 | 12 | 48 | Sika ViscoCrete 8 | Mixture of lithium carbonate and sodium silicate 4 | 24-1 | 42.1 |

Examples 12~15 employed the same solidification method as that in example 6 to obtain the cement solidified body samples of 12-1~15-1; examples 16~18 adopted the same solidification method as that in example 7 to obtain the cement solidified body samples of 16-1~18-1; examples 19~20 adopted the same solidification method as that in example 8 to obtain the cement solidified body samples of 19-1~20-1; examples 21~22 adopted the same solidification method as that in example 9 to obtain the cement solidified body samples of 21-1~22-1; and examples 23~24 adopted the same solidification method as that in example 10 to obtain the cement solidified body samples of 23-1~24-1.

The Cement Solidified Body Performance Test Results

All the performance test results of the cement solidified body samples prepared according to examples 6~24 of the present application were as follows:

1. Compressive Strength

In accordance with the method specified in GB 14569.1-1993, the compressive strengths of the boron-containing radioactive waste resin cement solidified body samples prepared according to examples 6~24 of the present application were measured. The measurement method was referred to GB14569.1-2011, and the compressive strength test results of the radioactive waste resins cement solidified body samples were respectively shown in tables 1-7.

TABLE 1 the compressive strength measurement results of the boron-containing radioactive waste resins cement solidified samples in example 6

| Sample No. | Compressive strength, MPa | Average, Mpa | Deviation, MPa | relative deviation, % |
|---|---|---|---|---|
| 1-1 | 17.6 | 15.6 | 2.0 | 12.8 |
| 1-2 | 17.4 | | 1.8 | 11.5 |
| 1-3 | 14.0 | | -1.6 | -10.3 |
| 1-4 | 12.7 | | -2.9 | -18.6 |
| 1-5 | 15.9 | | 0.3 | 1.9 |
| 1-6 | 16.0 | | 0.4 | 2.6 |

TABLE 2 the compressive strength measurement results of the boron-containing radioactive waste resins cement solidified samples in example 7

| Sample No. | Compressive strength, MPa | Average, Mpa | Deviation, MPa | relative deviation, % |
|---|---|---|---|---|
| 2-1 | 11.5 | 13.7 | -2.2 | -16.1 |
| 2-2 | 12.9 | | -0.8 | -5.8 |
| 2-3 | 15.4 | | 1.7 | 12.4 |
| 2-4 | 12.0 | | -1.7 | -12.4 |
| 2-5 | 12.9 | | -0.8 | -5.8 |
| 2-6 | 17.6 | | 3.9 | 28.5 |

TABLE 3 the compressive strength measurement results of the boron-containing radioactive waste resins cement solidified samples in example 8

| Sample No. | Compressive strength, MPa | Average, Mpa | Deviation, MPa | relative deviation, % |
|---|---|---|---|---|
| 3-1 | 11.3 | 12.5 | -1.2 | -9.6 |
| 3-2 | 13.2 | | 0.7 | 5.6 |
| 3-3 | 10.3 | | -2.2 | -17.6 |
| 3-4 | 12.7 | | 0.2 | 1.6 |
| 3-5 | 14.8 | | 2.3 | 18.4 |
| 3-6 | 12.5 | | 0 | 0 |

TABLE 4 the compressive strength measurement results of the boron-containing radioactive waste resins cement solidified samples in example 9

| Sample No. | Compressive strength, MPa | Average, MPa | Deviation, MPa | Relative deviation, % |
|---|---|---|---|---|
| 4-1 | 10.8 | 11.9 | -1 | -8.4 |
| 4-2 | 8.8 | | -3.1 | -26.05 |
| 4-3 | 16.1 | | 4.2 | 35.29 |
| 4-4 | 12.5 | | 0.6 | 5.04 |

TABLE 4-continued the compressive strength measurement results of the boron-containing
radioactive waste resins cement solidified samples in example 9

| Sample No. | Compressive strength, MPa | Average, MPa | Deviation, MPa | Relative deviation, % |
|---|---|---|---|---|
| 4-5 | 7.9 | | −4 | −33.61 |
| 4-6 | 15.4 | | 3.5 | 29.41 |

TABLE 5 the compressive strength measurement results of the boron-containing
radioactive waste resins cement solidified samples in example 10

| Sample No. | Compressive strength, MPa | Average, Mpa | Deviation, MPa | relative deviation, % |
|---|---|---|---|---|
| 5-1 | 9.6 | 9.7 | −0.1 | −1.0 |
| 5-2 | 9.0 | | −0.7 | −7.2 |
| 5-3 | 8.9 | | −0.8 | −8.2 |
| 5-4 | 11.3 | | 1.6 | 16.5 |
| 5-5 | 9.7 | | 0 | 0 |

TABLE 6 the compressive strength measurement results of the boron-containing
radioactive waste resins cement solidified samples in example 11

| Sample No. | Compressive strength, MPa | Average, Mpa | Deviation, MPa | relative deviation, % |
|---|---|---|---|---|
| 7-1 | 10.4 | 12.3 | −1.9 | −15.4 |
| 7-2 | 12.0 | | −0.3 | −2.4 |
| 7-3 | 11.5 | | −0.8 | −6.5 |
| 7-4 | 14.0 | | 1.7 | 13.8 |
| 7-5 | 13.8 | | 1.5 | 12.2 |

TABLE 7 the compressive strength measurement results of the cement
solidified samples in examples 12~24

| Sample No. | compressive strength, MPa |
|---|---|
| 12-1 | 10.6 |
| 13-1 | 11.3 |
| 14-1 | 12.0 |
| 15-1 | 12.7 |
| 16-1 | 13.9 |
| 17-1 | 14.0 |
| 18-1 | 15.1 |
| 19-1 | 15.8 |
| 20-1 | 16.1 |
| 21-1 | 16.4 |
| 22-1 | 16.7 |
| 23-1 | 17.4 |
| 24-1 | 17.5 |

GB 14569.1-1993 specified that "the compressive strength of the cement solidified sample should not less than 7 MPa", as seen from Tables 1~7: the compressive strengths of the waste resins cement solidified body samples were all higher than 7 MPa, which met the above-mentioned requirement.

As seen from examples 1~24: on the basis of the increasing containment capacity, the strengths of the waste resins cement solidified body samples, although were decreased somewhat, can meet the requirement of GB 14569.1-1993, and also can meet the requirement of GB14569.1-2011. In these examples, the containment capacities of the waste resins were 40~59%, which were increased by more than 15% as compared with that in the conventional techniques.

2. Impact Test

In accordance with the method specified in GB 14569.1-1993 "Characteristic requirements for solidified body of low and intermediate level radioactive waste—Cement solidified body", the impact resistances of the waste resins cement solidified body samples prepared according to the present application were determined. The basic parameters and impact resistance test results of the samples were shown in Table 8.

TABLE 8 the basic parameters and test results of the cement solidified
body in the impact test

| Sample No. | Weight, g | Dimension $\phi \times h$, mm | Result |
|---|---|---|---|
| 1-1 | 213.8 | 51.9 × 53.2 | small fragments with sharp edges and corners |
| 2-1 | 199.1 | 50.9 × 51.3 | small fragments with sharp edges and corners |
| 3-3 | 207.9 | 51.6 × 51.8 | small fragments with sharp edges and corners |
| 4-5 | 203.0 | 51.6 × 51.5 | small fragments with sharp edges and corners |
| 5-1 | 207.2 | 51.9 × 52.3 | Broken into two halves |
| 7-6 | 206.6 | 51.4 × 51.4 | small fragments with sharp edges and corners |
| 1-5 | 176.3 | 49.9 × 5.27 | small fragments with sharp edges and corners |
| 2-3 | 180.7 | 49.8 × 51.8 | small fragments with sharp edges and corners |
| 3-5 | 180.8 | 49.8 × 52.3 | small fragments with sharp edges and corners |
| 4-1 | 182.3 | 49.9 × 52.3 | small fragments with sharp edges and corners |
| 5-3 | 184.3 | 50.1 × 52.4 | small fragments with sharp edges and corners |
| 7-4 | 186.0 | 49.6 × 52.9 | small fragments with sharp edges and corners |

GB14569.1-2011 also specified that "when freefell vertically from a height of 9 m to the concrete floor, the cement solidified body samples should not be broken obviously", the samples prepared according to the present application appeared only small fragments with sharp edges and corners as well as small cracks, as seen from the above table: only one sample in the 12 samples in examples 6~11 was broken into two halves after the drop test, indicating that the impact resistances of the waste resins cement solidified bodies prepared according to the present application were excellent, which met the requirement of GB14569.1-2011.

3. Water Resistance Test 3.1 Leach Resistance

Table 9 listed the $A_0$ value of the total activity of the radionuclides within the solidified samples

TABLE 9 the $A_0$ value of each individual radionuclide in the cement solidified body

| Sample No. | Sample Weight, g | The total activity $A_0$ of the radionuclides, Bq | | |
|---|---|---|---|---|
| | | $^{90}Sr$ | $^{137}Cs$ | $^{60}Co$ |
| 1-6 | 202.3 | $5.22 \times 10^3$ | $4.75 \times 10^4$ | $1.37 \times 10^7$ |
| 2-2 | 209.0 | $5.39 \times 10^3$ | $4.91 \times 10^4$ | $1.43 \times 10^7$ |
| 3-6 | 204.2 | $5.27 \times 10^3$ | $4.79 \times 10^4$ | $1.40 \times 10^7$ |

Figure 1:
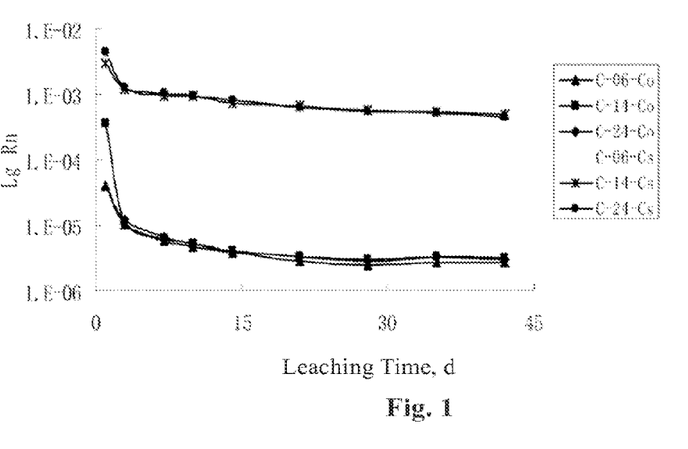
FIG. 1 is a semi-logarithmic curve graph of the leaching rate of the nuclides in the waste resin cement solidified blocks over the former 42 days according to an embodiment of the present application.
Figure 2:
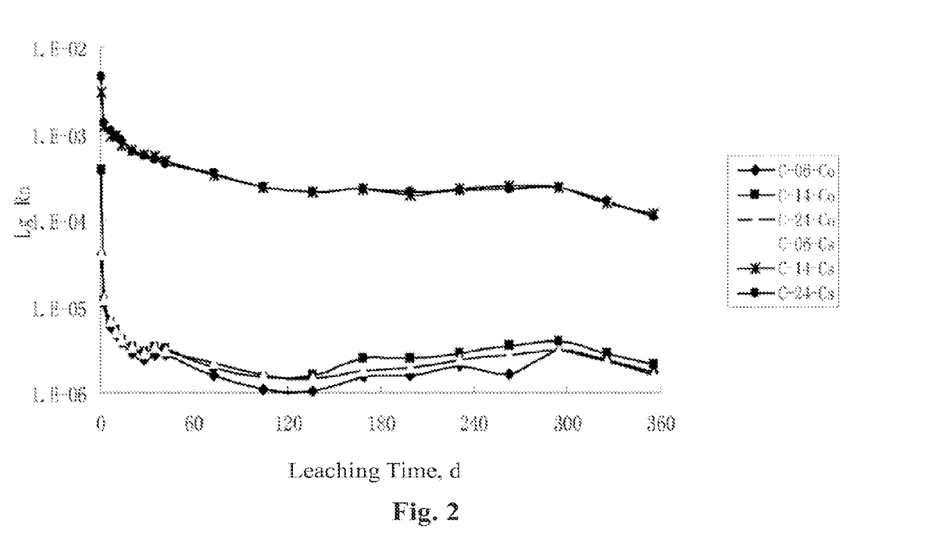
FIG. 2 is a semi-logarithmic curve graph of the leaching rate of the nuclides in the waste resin cement solidified blocks over one year according to an embodiment of the present application.

Table 10 listed the leaching rate results of the arbitrarily selected three resin-cement solidified body samples on day 42, and FIG. 1 showed the leaching test results of the above-mentioned cement solidified body samples over the former 42 days. FIG. 2 showed the leaching test results of the cement solidified body samples over one year.

TABLE 10 the leaching rate of each radionuclide in the cement solidified body samples on day 42

| Sample No. | Leaching days | $^{90}Sr$ Rn, cm/d | $^{137}Cs$ Rn, cm/d | $^{60}Co$ Rn, cm/d |
|---|---|---|---|---|
| 1-6 | 42 | $2.71 \times 10^{-5}$ | $5.08 \times 10^{-4}$ | $2.76 \times 10^{-6}$ |
| 2-2 | | $1.56 \times 10^{-5}$ | $4.89 \times 10^{-4}$ | $3.21 \times 10^{-6}$ |
| 3-6 | | $2.37 \times 10^{-5}$ | $4.43 \times 10^{-4}$ | $3.04 \times 10^{-6}$ |

As seen from the data in Table 10, in the boron-containing radioactive waste resins cement solidified body samples, the leaching rate (Rn) of the three radionuclides $^{90}Sr$, $^{60}Co$ and $^{137}Cs$ on day 42 were all lower than the limits specified in National Standard GB 14569.1-2011, which met the requirement.

As Pu-239 was absent in the waste source items from a nuclear power plant, it was not analyzed in the test.

After one year long-term leaching test, the apparent qualities of the waste resins solidified bodies were changed, two (1-6 and 3-6) of the three samples appeared cracks on the surfaces. In table 11, the compressive strengths of the samples after long-term leaching tests were determined, and the results showed that the compressive strengths of the solidified samples after a long-term leaching still met the limits requirements of 7 MPa in the National Standard, and were much higher than that before the leaching tests. In fact, the solidified body of the ordinary neat slurry cement without aggregates generally appeared small cracks over time, not to mention that the three samples were all soaked in water for one year. As seen from the analysis data, the radioactive leaching rates were not increased, but the compressive strengths were significantly increased, with the test results of 18.4 MPa-27.2 MPa, 15.6 MPa, which were greatly higher than the original means of 15.6 MPa, indicating that these small cracks did not affect the performance indexes of the solidified body.

TABLE 11 the compressive strengths of the waste resins cement solidified body after leaching for one year

| Sample No. | Diameter, mm | Pressure, kN | compressive strength, MPa | Average compressive strength, MPa |
|---|---|---|---|---|
| 1-6 | 51.3 | 56.1 | 27.2 | 22.2 |
| 2-2 | 51.5 | 43.6 | 20.9 | |
| 3-6 | 51.0 | 37.5 | 18.4 | |

3.2 Soaking Resistance

The waste resins cement solidified body samples used in the soaking resistance tests were prepared by using the solidification agents in examples 1~5, by the same solidification method as that in examples 6~11, and the basic parameters of the cement solidified body samples were shown in table 12. The soaking resistance test results were shown in table 13.

As seen from this table, the compressive strengths of 5 waste resins cement solidified body samples after the soaking resistance tests were all higher than 7 MPa, and the compressive strengths after soaking were lost by 10.2% as compared with that before the soaking resistance tests, which met the requirement specified in GB 14569.1-2011.

TABLE 12 the basic parameters of the soaking resistance tests of the waste resins cement solidified body samples

| | Before soaking | | After soaking | |
|---|---|---|---|---|
| Sample No. | Weight, g | Dimension φ × h, mm | Mass, g | Dimension φ × h, mm |
| 1-4 | 211.0 | 51.8 × 52.2 | 214.6 | 52.1 × 52.4 |
| 2-4 | 203.8 | 51.6 × 51.0 | 207.8 | 52.3 × 51.0 |
| 3-1 | 207.5 | 51.8 × 51.4 | 211.2 | 51.8 × 52.0 |
| 4-2 | 207.4 | 51.2 × 52.7 | 211.2 | 51.3 × 52.4 |
| 5-4 | 208.8 | 51.2 × 51.4 | 212.0 | 51.9 × 52.0 |

TABLE 13 the soaking resistance test results of the waste resins cement solidified body samples

| Sample No. | Compressive strength after soaking, MPa | Average compressive strength after soaking, MPa | Compressive strength before soaking, MPa | Change, % |
|---|---|---|---|---|
| 1-4 | 13.3 | 14.0 | 15.6 | −10.2 |
| 2-4 | 11.5 | | | |
| 3-1 | 13.9 | | | |
| 4-2 | 16.5 | | | |
| 5-4 | 14.7 | | | |

4. Frozen-Thawed Resistance

The frozen-thawed resistance tests were carried out on the prepared resin—cement solidified body samples, and the frozen-thawed resistance test results were that the compressive strengths of the six samples after the frozen-thawed resistance tests were all higher than 7 MPa, and the average compressive strengths after the frozen-thawed resistance tests were lost by only 6.2% as compared with that before the frozen-thawed resistance tests, which met the requirement of GB 14569.1-2011. The test results were shown in table 14.

TABLE 14 the frozen-thawed resistance test results of the waste resin cement solidified body samples

| Sample No. | Compressive strength after frozen-thawed, MPa | Average compressive strength after frozen-thawed, MPa | Compressive strength before frozen-thawed, MPa | Change, % |
|---|---|---|---|---|
| 2-1 | 12.8 | 12.1 | 12.9 | −6.2 |
| 3-3 | 10.0 | | | |
| 4-1 | 11.5 | | | |
| 5-2 | 13.4 | | | |
| 7-5 | 9.7 | | | |
| 1-2 | 14.9 | | | |

5. γRadiation Resistance

As the real radioactive resins cement solidified body samples can not be irradiated in the cobalt source irradiation room, irradiations were carried out on the non-radioactive simulated waste resins cement solidified body only. GB14569.1-1993 specified that the samples were prepared by "preparing a cement slurry with a non-radioactive simulated waste according to the specified formulation, and pouring the cement slurry directly into the test mold".

The irradiation tests were carried out in the $^{60}$Co source room, six samples were irradiated in total. The irradiation dose rate of the test samples was $1.565 \times 10^3$ Gy/h, the total exposed time was 652 h, the cumulative radiation dose was $1 \times 10^6$ Gy. After irradiation, the samples were tested for the compressive strengths, and the test results were shown in table 15.

GB14569.1-2011 also specified that: "after γirradiation test, the compressive strength of the cement solidified body sample was lost by not more than 25%."

As seen from table 15, the compressive strengths of the solidified bodies before and after γirradiation were all higher than 7 MPa, and after irradiation, the compressive strengths of the solidified bodies had no loss, which met the requirement of GB 14569.1-2011.

TABLE 15 theγradiation resistance test results of the waste resins cement solidified body

| | Before γradiation | | | After γradiation | | |
|---|---|---|---|---|---|---|
| Sample No. | Compressive strength (MPa) | Average compressive strength (MPa) | Sample No. | Compressive strength (MPa) | Average compressive strength (MPa) | Change (%) |
| 2-09 | 16.9 | 15.7 | 2-09 | 16.1 | 14.8 | −7.9 |
| 2-10 | 16.2 | | 2-10 | 15.6 | | |
| 2-11 | 14.1 | | 2-11 | 13.7 | | |
| 2-12 | 13.8 | | 2-12 | 12.6 | | |
| 2-13 | 16.9 | | 2-13 | 16.1 | | |
| 2-14 | 16.3 | | 2-14 | 15.4 | | |

6. Optimization Analysis of the Radiation Protection

As compared the present application with the conventional techniques, the operator received doses from the waste resin solidification were compared and analyzed, and listed in table 16:

TABLE 16 as compared the present application with the conventional techniques, the comparison and analysis of the personnel received doses

| Solidification agent | Number of solidification barrel (amount) | Volume (m³) | Collective doses (mSv · man) | received doses per producing 1 m³ waste (mSv/man) |
|---|---|---|---|---|
| The conventional techniques | 18 | 36 | 1.806 | 0.0502 |
| The present application | 14 | 28 | 1.425 | 0.0509 |

As seen from table 16: as compared the present application with the conventional techniques, the effects on staffs seemed to be insignificantly different. However, the barrel numbers of cement solidified body wastes produced for treating the same amount of waste resins were less, the operation time was short, thus radioactive radiation doses received by the staffs were reduced correspondingly. As for the increase of the solidified waste resin amount in the waste barrel resulting in the increase of the radiation dose on the outside surface of the waste barrel, the effective control measures may be carried out, for example by matching the high and low dose levels of waste resins; adding monitoring instruments in the metering tank; establishing the variation relationship between the dose of the metering tank and the dose on the barrel surface, etc., to ensure the radiation protection safety when the waste resins were treated according to the cement solidification formulations of the present application. As most of the radionuclides adsorbed in the waste resins were short lifetime, such as the dose rate on the barrel surface was slightly higher than the 2 mSv/h, they can be decayed via a temporary storage method, and transported when the decay reached the level which was less than the transportation standard.

7. Conclusion

As seen from the actual operations and the solidified body performance test results in the trial production, the following conclusions can be obtained:

Cement solidification formulations and solidification methods of the present application have the advantages that: the production process is feasible, the performance indexes of the radioactive waste resin cement solidified bodies can all meet the requirements of GB 14569.1-2011, and the containment rate of the high level boron containing radioactive waste resins were greatly increased as compared with the conventional techniques.

What is claimed is:

1. A cement solidification formulation for a high level boron containing radioactive waste resins from a nuclear power plant, wherein on the basis of solidification of 100 parts by weight of the high level boron containing waste resins, the cement solidification formulation comprises by weight part: 170-260 parts of cement, 5-20 parts of lime, 20-60 parts of water, 0.25-10 parts of curing agent and 2-20 parts of additive agent; wherein the additive agent is a mixture of at least two selected from the group consisting of sodium hydroxide, lithium carbonate and sodium silicate, wherein the curing agent includes a polycarboxylate water reducing agent in 0.25-5 parts by weight.

2. The cement solidification formulation according to claim 1, wherein on the basis of solidifying 100 parts by weight of the high level boron containing waste resins, the cement solidification formulation comprises by weight part: 170-200 parts of cement, 10-20 parts of lime, 20-40 parts of water, 0.25-10 parts of curing agent and 4-15 parts of additive agent.

3. The cement solidification formulation according to claim 1, wherein the polycarboxylate water reducing agent is one selected from the group consisting of sodium polyacrylate, potassium polyacrylate, sodium polybutenoate, potassium polybutenoate, Basf glenium51, and Sika Visco-Crete.

4. The cement solidification formulation according to claim 1, wherein the curing agent further comprises a sodium metaaluminate in 1-5 parts by weight.

5. The cement solidification formulation according to claim 1, wherein on the basis of solidifying 100 parts by weight of the high level boron containing waste resins, the cement solidification formulation comprises by weight part: 198 parts of cement, 11 parts of lime, 30 parts of water, 0.25 parts of curing agent, and 3.70 parts of additive agent; wherein the curing agent is sodium polyacrylate, and the additive agent is a mixture of sodium hydroxide and lithium carbonate.

6. The cement solidification formulation according to claim 1, wherein on the basis of solidifying 100 parts by weight of the high level boron containing waste resins, the cement solidification formulation comprises by weight part: 184 parts of cement, 10 parts of lime, 19 parts of water, 2 parts of curing agent, and 2 parts of additive agent; wherein the curing agent is sodium polybutenoate, and the additive agent is a mixture of sodium hydroxide and sodium silicate.

7. The cement solidification formulation according to claim 1, wherein on the basis of solidifying 100 parts by weight of the high level boron containing waste resins, the cement solidification formulation comprises by weight part: 170 pats of cement, 9 parts of lime, 29 parts of water, 1 part of curing agent, and 2.3 parts of additive agent; wherein the curing agent is SikaViscoCrete 20HE, and the additive is a mixture of lithium carbonate and sodium silicate.

8. A solidification method for a high level boron containing radioactive waste resins from a nuclear power plant, wherein the solidification method comprises:

1) weighing or metering the raw materials of solidification agents and high level boron containing waste resins, and the solidification formulation of the solidification agents comprises by weight part: 170-260 parts of cement, 5-20 parts of lime, 20-60 parts of water, 0.25-10 parts of curing agent and 2-20 parts of additive agent, on the basis of solidifying 100 parts by weight of the high level boron containing waste resins; wherein the additive agent is a mixture of at least two selected from the group consisting of sodium hydroxide, lithium carbonate and sodium silicate;

2) adding the lime of the raw materials into a solidification container;

3) adding the metered high level boron containing waste resins, the curing agent and the additive agent into the solidification container;

4) adding the cement into the solidification container with stirring, meanwhile adding water under stirring until homogeneous;

5) standing and maintaining the obtained mixture.

9. The solidification method according to claim 8, wherein the solidification formulation in the step 1) comprises the raw materials by weight part: 170-200 parts of cement, 10-20 parts of lime, 20-40 parts of water, 0.25-10 parts of curing agent and 4-15 parts of additive agent, on the basis of solidifying 100 parts by weight of the high level boron containing waste resins.

10. The solidification method according to claim 8, wherein the curing agent in the solidification formulation in the step 1) contains a polycarboxylate water reducing agent in 0.25-5 parts by weight.

11. The solidification method according to claim 8, wherein the polycarboxylate water reducing agent in the solidification formula is selected from the group consisting of sodium polyacrylate, potassium polyacrylate, sodium polybutenoate, potassium polybutenoate, Basf glenium51, Sika ViscoCrete.

12. The solidification method according to claim 8, wherein, in the step 1), the curing agent further comprises sodium metaaluminate in 1-5 parts by weight.

13. The solidification method according to claim 8, wherein the weight of high level boron containing waste resins to be added and the weight of water to be added are calculated according to the weight percent of free water in the high level boron containing waste resins respectively, the raw materials of the solidification agents are weighed, and the curing agent and the additive agent are dissolved in water to prepare a solution respectively.

14. The solidification method according to claim 8, wherein, in the step 3), the high level boron containing waste resins with free water are added into the solidification container by means of a metering tank, a stirring paddle is actuated to carry out stirring, then the curing agent and additive agent are added, wherein the start stirring speed is 15-25 rpm, the late stirring speed is 40-60 rpm, the total period of stirring is 100-120 min, and the stirring mode is a vertical shaft type.

15. The solidification method according to claim 8, wherein, in the step 4), a stirring machine is started at a speed of 15-25 rpm, the cement is added into the container under stirring at a speed of 800-1200 kg/h via a cement hopper, and the water is added stepwise under stirring until the weight of water meets the requirements of the solidification formulation, stirring is continued for 0.5 h, and the stirring is carried out by moving the paddle up and down, until stirring to homogeneity.

16. The solidification method according to claim 8, wherein in the step 5), after the stirring is stopped, the solidification container is sent to a maintaining room, covered with coverings on the surface, and stood and maintained for 28 days.

* * * * *